(12) United States Patent
Greger et al.

(10) Patent No.: US 6,318,799 B1
(45) Date of Patent: *Nov. 20, 2001

(54) ADJUSTABLE CAR SEAT BASE

(75) Inventors: Jeff G. Greger, Lititz; Michael L. Longenecker, Ephrata, both of PA (US)

(73) Assignee: Graco Children's Products Inc., Elverson, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,834

(22) Filed: Feb. 17, 1999

(51) Int. Cl.[7] ........................................ A47D 1/10
(52) U.S. Cl. ........................ 297/256.13; 297/256.16
(58) Field of Search ................. 297/344.18, 344.12, 297/339, 256.13, 250.1, 256.1, 256.11, 256.16; 248/188.4

(56) References Cited

U.S. PATENT DOCUMENTS

| | | | |
|---|---|---|---|
| 2,521,281 | * 9/1950 | Brousseau . | |
| 4,228,745 | * 10/1980 | Gale . | |
| 4,632,456 | 12/1986 | Kassai | 297/328 |
| 4,688,850 | 8/1987 | Brownlie et al. | 297/270 |
| 4,733,909 | 3/1988 | Single, II et al. | 297/250 |
| 4,754,999 | 7/1988 | Kain | 297/250 |
| 4,790,593 | * 12/1988 | Davalos et al. . | |
| 4,909,574 | 3/1990 | Sedlack | 297/488 |
| 4,943,113 | 7/1990 | Meeker | 297/250 |
| 4,976,494 | 12/1990 | Polley | 297/464 |
| 5,052,749 | 10/1991 | Groenendijk | 297/250 |
| 5,052,750 | 10/1991 | Takahashi et al. | 297/250 |
| 5,058,283 | 10/1991 | Wise et al. | 33/371 |
| 5,106,154 | * 4/1992 | Kain . | |
| 5,110,182 | 5/1992 | Beauvais | 297/216 |
| 5,141,190 | * 8/1992 | Wu . | |
| 5,181,761 | 1/1993 | Meeker | 297/250 |
| 5,277,472 | 1/1994 | Freese et al. | 297/130 |
| 5,335,964 | 8/1994 | Sedlack et al. | 297/256.13 |
| 5,346,279 | * 9/1994 | Pecorella . | |
| 5,378,038 | 1/1995 | Koyanagi et al. | 297/256.13 |
| 5,380,062 | 1/1995 | Nania | 297/256.13 |
| 5,427,432 | 6/1995 | Meeker et al. | 297/256.15 |
| 5,478,135 | 12/1995 | Kain | 297/256.16 |
| 5,494,331 | 2/1996 | Onishi et al. | 297/256.13 |
| 5,507,558 | 4/1996 | Kain | 297/256.15 |
| 5,533,457 | * 7/1996 | Cox . | |
| 5,551,751 | 9/1996 | Sedlack et al. | 297/256.13 |
| 5,581,234 | 12/1996 | Emery et al. | 340/457.1 |
| 5,599,063 | 2/1997 | Lister et al. | 297/325 |
| 5,607,203 | 3/1997 | Sedlack | 297/256.15 |
| 5,609,393 | 3/1997 | Meeker et al. | 297/256.13 |

(List continued on next page.)

FOREIGN PATENT DOCUMENTS

490729 * 2/1930 (DE) .................................. 297/339

OTHER PUBLICATIONS

Century catalog, 6 pages, (1995).
Graco "Infant Safety Seat/Carrier" Owner's Manual, 49 pages, (1998).
Instruction Manual & Brochure, "On MY Way™ Position Right™ Rear Facing Infant Car Seat," Evenflow®, 8 pp. (Dec. 1998).

Primary Examiner—Milton Nelson, Jr.
(74) Attorney, Agent, or Firm—Foley & Lardner

(57) ABSTRACT

An adjustable car seat base (10) includes a frame (20) that is positioned on a vehicle seat (12) to receive an infant carrier. An adjustment end (28) slidable receives a foot (18) which is raised and lowered by an adjustment assembly (80). The adjustment assembly (80) includes a knob (82) that rotates an externally threaded universal joint (90). The foot (18) is provided with an inward thread (78) engaged by the external threads. Movement of the foot (18) adjusts the position of the car seat base (10) with respect to the vehicle seat surface (12).

18 Claims, 4 Drawing Sheets

U.S. PATENT DOCUMENTS

| | | | |
|---|---|---|---|
| 5,722,719 | 3/1998 | Glomstad | 297/216.11 |
| 5,746,478 | 5/1998 | Lumley et al. | 297/256.13 |
| 5,810,436 * | 9/1998 | Surot . | |
| 5,836,650 | 11/1998 | Warner, Jr. et al. | 297/256.11 |
| 5,881,979 * | 3/1999 | Rozier, Jr. et al. . | |
| 6,042,182 * | 3/2000 | Geis et al. . | |

* cited by examiner

ADJUSTABLE CAR SEAT BASE

TECHNICAL FIELD

This invention relates to a base for an infant car seat. More particularly, this invention relates to an infant seat base which is adjustable to accommodate the varying incline of the automobile seat which supports the infant car seat base and attached infant carrier. Specifically, this invention relates to an infant car seat base which has an easily accessed adjustment mechanism for raising and lowering one end of the car seat base.

BACKGROUND ART

Child or infant car seats are especially designed to carry an infant or toddler in a vehicle. Child car seats serve two primary purposes. First, the child car seat retrains and prevents injury to the child in the event of an accident. Secondly, the child car seat holds the child in a comfortable manner so that the child does not move about the car while it is being driven.

Car seats are secured to an automobile seat by either a lap or lap/shoulder seat belt. Typically, infants that weigh up to 22 pounds are placed in a rear-facing position. A rear-facing position is employed for infants so as to better support their head and neck during transport and in a crash. Proper recline is important for very young infants who lack the muscular strength to hold their head up or to address the potential of positional asphyxia. Alternatively, a car seat base may be secured to the vehicle seat by the seat belt. The infant car seat is then latched to the base. This eliminates having to always thread a belt through the car seat when traveling from one place to another.

Unfortunately, known car seats, by themselves, are unable to accommodate varying inclines of the supporting automobile seat on which it is placed. The car seats which do provide an adjustment feature only provide two or three coarse adjustment levels. As such, it may not provide the necessary fine adjustment to allow for support of the child's head and neck.

Thus, the need exists for an infant car seat base which accommodates the various inclines of supporting automobile seats.

DISCLOSURE OF THE INVENTION

It is therefore an object of the present invention to provide an infant car seat base with an infinite level adjustment feature.

It is another object of the present invention to provide a car seat base, as above, that includes a vehicle belt path at one end for receiving a seat belt, wherein latching of the belt secures the car seat base to an automobile car seat. The car seat base detachably receives an infant carrier in the rearward-facing direction for the safety and comfort of the infant.

It is still another object of the present invention to provide a car seat base, as above, in which an adjustable foot is provided that raises and lowers the base with respect to the automobile seat surface, thus ensuring optimal position of the infant carrier and the infant.

It is yet another object of the present invention to provide a car seat base, as above, in which a rotatable knob is located at or near the end of the car seat base adjacent the vehicle seat back, the rotation of the knob allowing for adjustment of the foot position.

It is a further object of the present invention to provide a car seat base, as above, in which an underside of the base has downwardly-extending towers that align and are slidable within guide channels provided by the foot.

It is yet a further object of the present invention to provide a car seat base, as above, in which the foot is provided with an internal thread.

It is still a further object of the present invention to provide a car seat base, as above, in which the rotatable knob is connected to a universal joint having external threads that mesh with the internal thread of the base whereby rotation of the knob raises and lowers the foot with respect to the base depending upon the knob's direction of rotation.

It is an additional object of the present invention to provide a car seat base, as above, which provides for optimal positioning of the infant and wherein raising of the car seat base allows for further tightening of the belt.

These and other objects of the present invention, as well as the advantages thereof over existing prior art forms, which will become apparent from the description to follow, are accomplished by the improvements hereinafter described and claimed.

In general, a car seat support made in accordance with the present invention includes a base adapted to rest on an automobile car seat. The base includes an adjustment end and a foot is coupled to the adjustment end and an adjustment mechanism is connected to the foot. The foot can be moved with respect to the adjustment end to change the level of the base with respect to the automobile seat.

The preferred infant car seat base incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
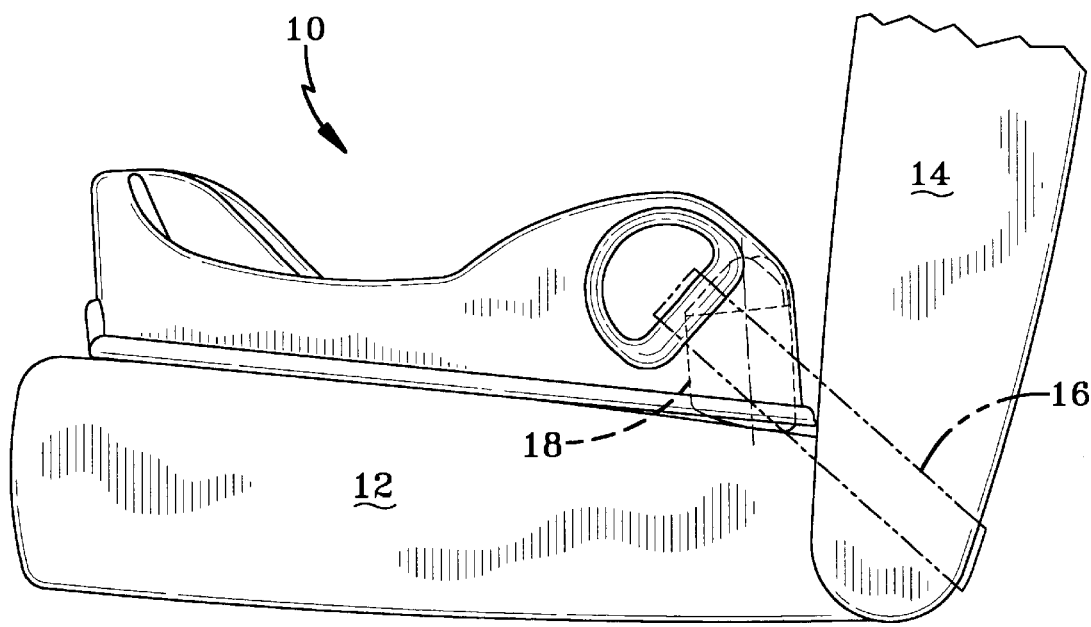
FIG. 1 is an elevational view of an adjustable car seat base secured to an automobile seat and shown in an inclined position.
Figure 2:
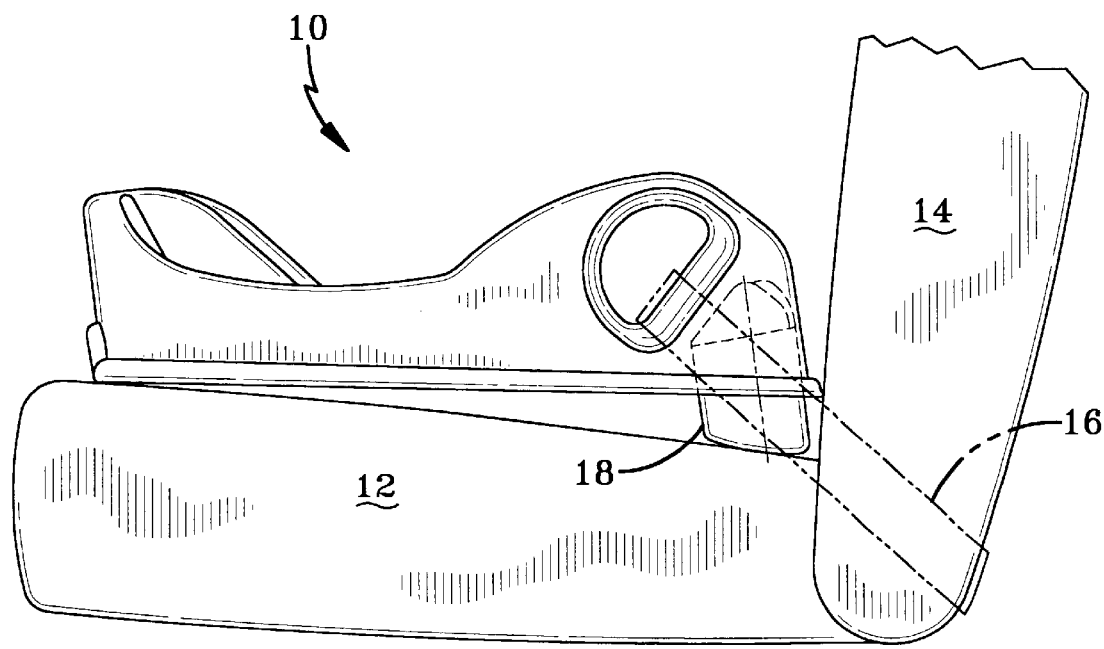
FIG. 2 is a side elevational view showing the adjustable car seat base in a raised and level position with respect to the automobile seat.
Figure 3:
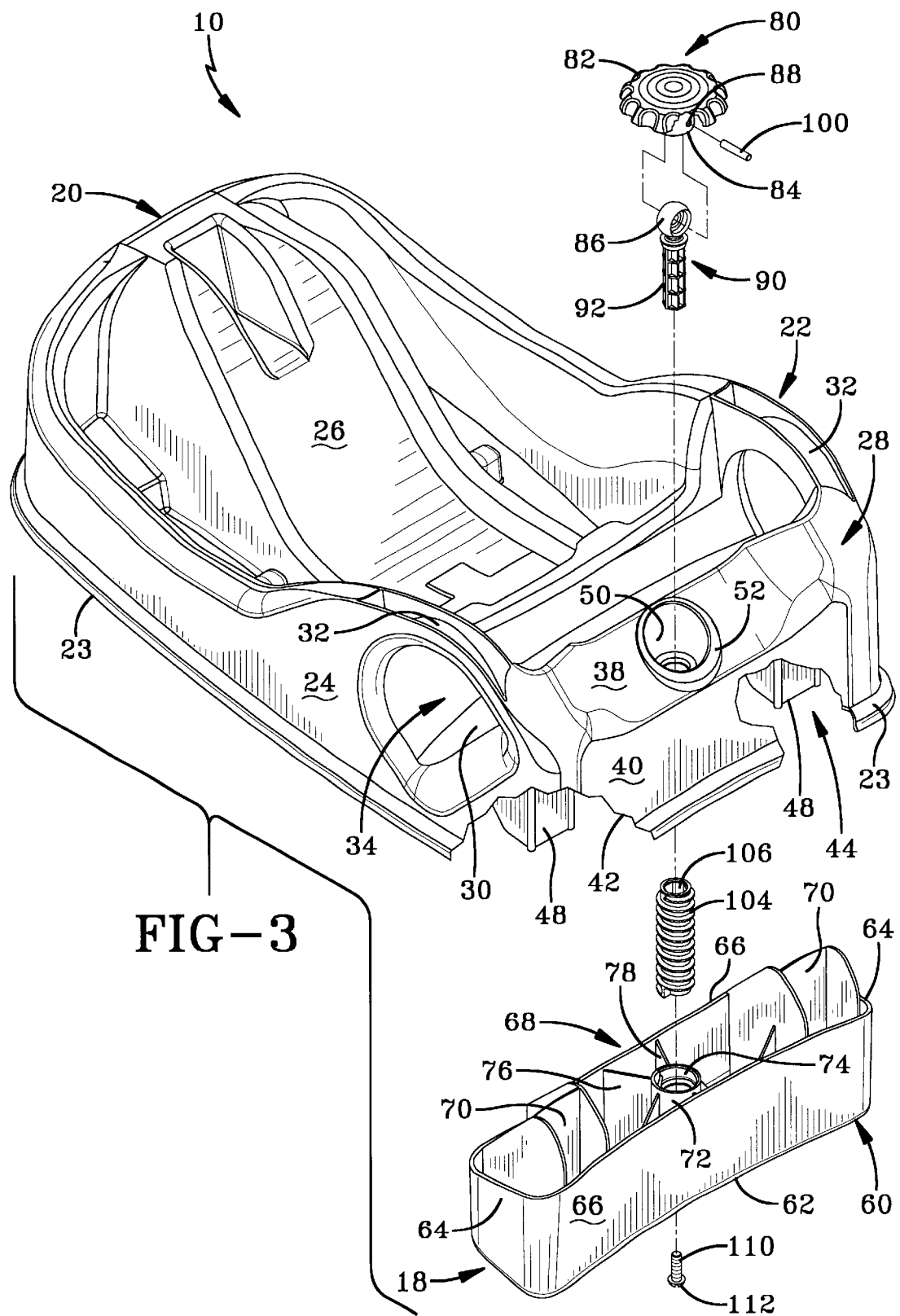
FIG. 3 is an exploded and partially fragmented view of the adjustable car seat base.

A car seat base with level adjustment in accordance with the concepts of the present invention is indicated generally by the numeral 10 in the accompanying drawings, and is best seen generally in FIGS. 1–3. Environmentally, base 10 is intended to be positioned on an automobile seat 12 such that one end of base 10 abuts or is positioned adjacent to an automobile seat back 14. An automobile seat belt 16, which may be a lap belt or a lap/shoulder belt, is employed to secure car seat base 10 to the automobile seat. Car seat base 10 is configured to latchably receive an infant carrier for the convenience of the person traveling with an infant. Generally, car seat bases allow the person to secure the infant carrier to a fixed item in the automobile without having to secure the seat belt thereto each and every time the infant carrier is placed in the car. Use of a car seat base ensures that a secure attachment is made to the infant carrier each and every time.

As discussed above, and as can be seen in FIGS. 1 and 2, automobile seats normally provide a downward incline toward back 14. As seen in FIG. 1, this imparts a downward angle to base 10 which is unacceptable in transporting an infant carrier. As best seen in FIG. 2 and as described in further detail below, an adjustable foot, generally indicated by the numeral 18, is provided at an end of the car seat base 10 to properly level it and optimize the safety and comfort of the infant in the detachable infant carrier.

As best seen in FIG. 3, car seat base 10 includes a frame 20 with a vehicle belt path 22 which is partially enclosed to retain car seat belt 16 and partially open to allow threading of belt 16 therethrough. Of course, automobile seat belt 16 is buckled or attached to a latching device and pulled tight to firmly secure frame 20 to automobile seat 12. Adjustable foot 18 is proximally positioned near vehicle belt path 22 and functions to raise and lower frame 20 with respect to automobile seat 12. Generally, the level of base 10 or attached infant carrier may be checked with a level indicator such as provided and disclosed in U.S. Pat. No. 5,058,283, which is incorporated herein by reference. In addition to leveling car seat base 10, adjusting the foot 18 also causes further tightening of automobile seat belt 16 in belt path 22. As such, car seat base 10 is further secured to the vehicle seat.

Frame 20 includes a seat surface rim 23 which extends around the bottom outer periphery thereof. Sidewalls 24 extend upwardly from seat surface rim 23 and a carrier surface 26 is formed between sidewalls 24. Carrier surface 26 receives and latches to the infant carrier (not shown) in a manner well known in the art.

An adjustment end 28 is provided at one end of frame 20 and, as seen in FIGS. 1 and 2, is positioned adjacent car seat back 14. Belt path 22 is positioned between sidewalls 24 and includes a belt surface 30. A loop 32 extends upwardly from each sidewall 24 and forms an opening 34 for receiving belt 16. As such, loops 32 function to retain belt 16 while opening 34 between loops 32 allows for an individual to thread seat belt 16 therethrough.

Adjustment end 28 includes a knob surface 38 which extends angularly from belt surface 30 toward a back surface 40 which is essentially parallel with or at least adjacent to automobile seat back 14 when in place. An adjustment undersurface 42 is provided underneath knob surface 38 and forms an inverted foot trough 44 for receiving foot 18. A pair of towers 48 extend downwardly from adjustment undersurface 42 to the same level as seat surface rim 23. Only two towers are shown in this embodiment, but it will be appreciated that one tower or more than two towers could be provided.

Figure 4:
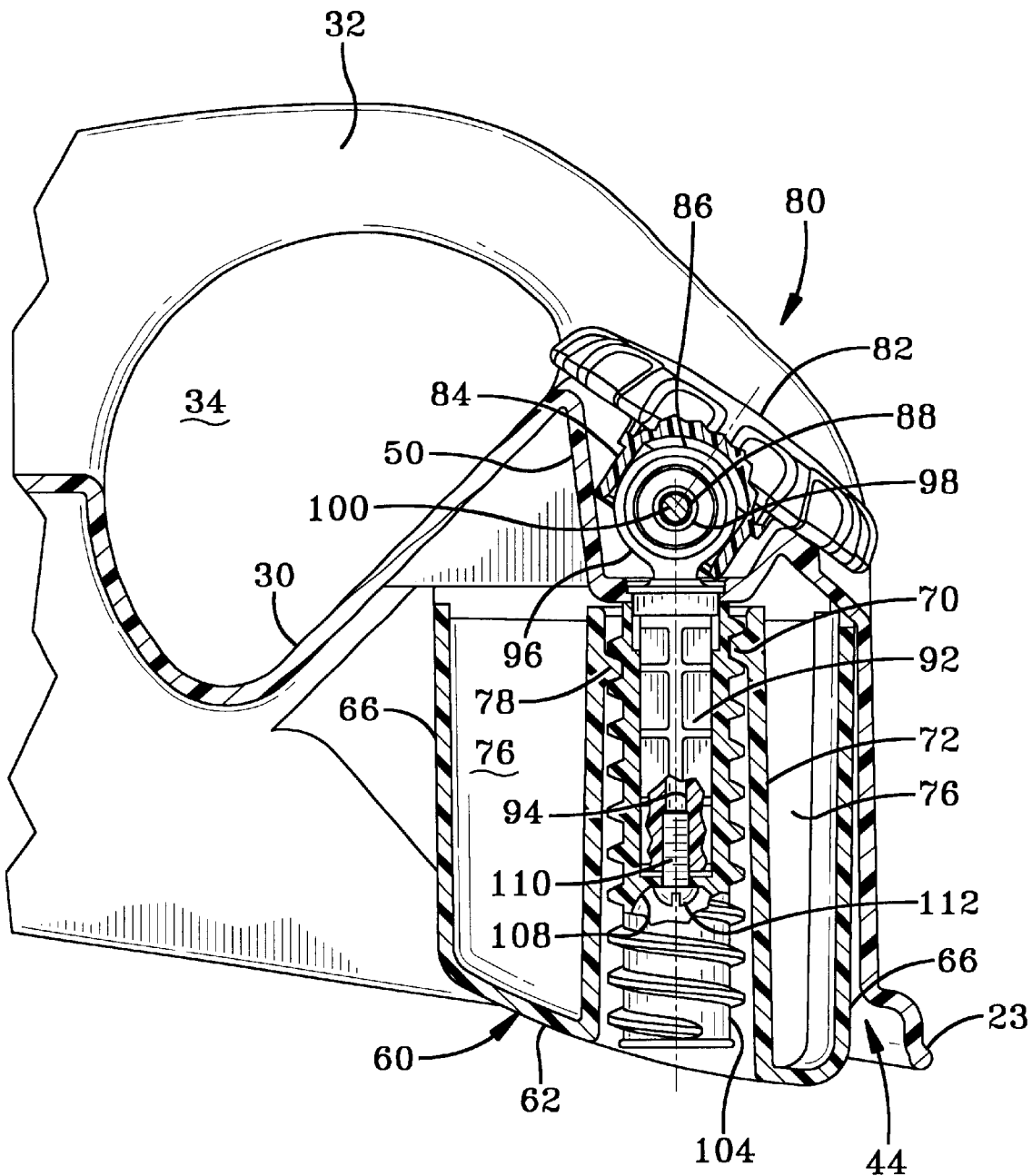
FIG. 4 is a partial cross-sectional view of an adjustment mechanism which controls the raising and lowering of a foot with respect to the car seat base, wherein the foot is shown in a lowered position.
Figure 5:
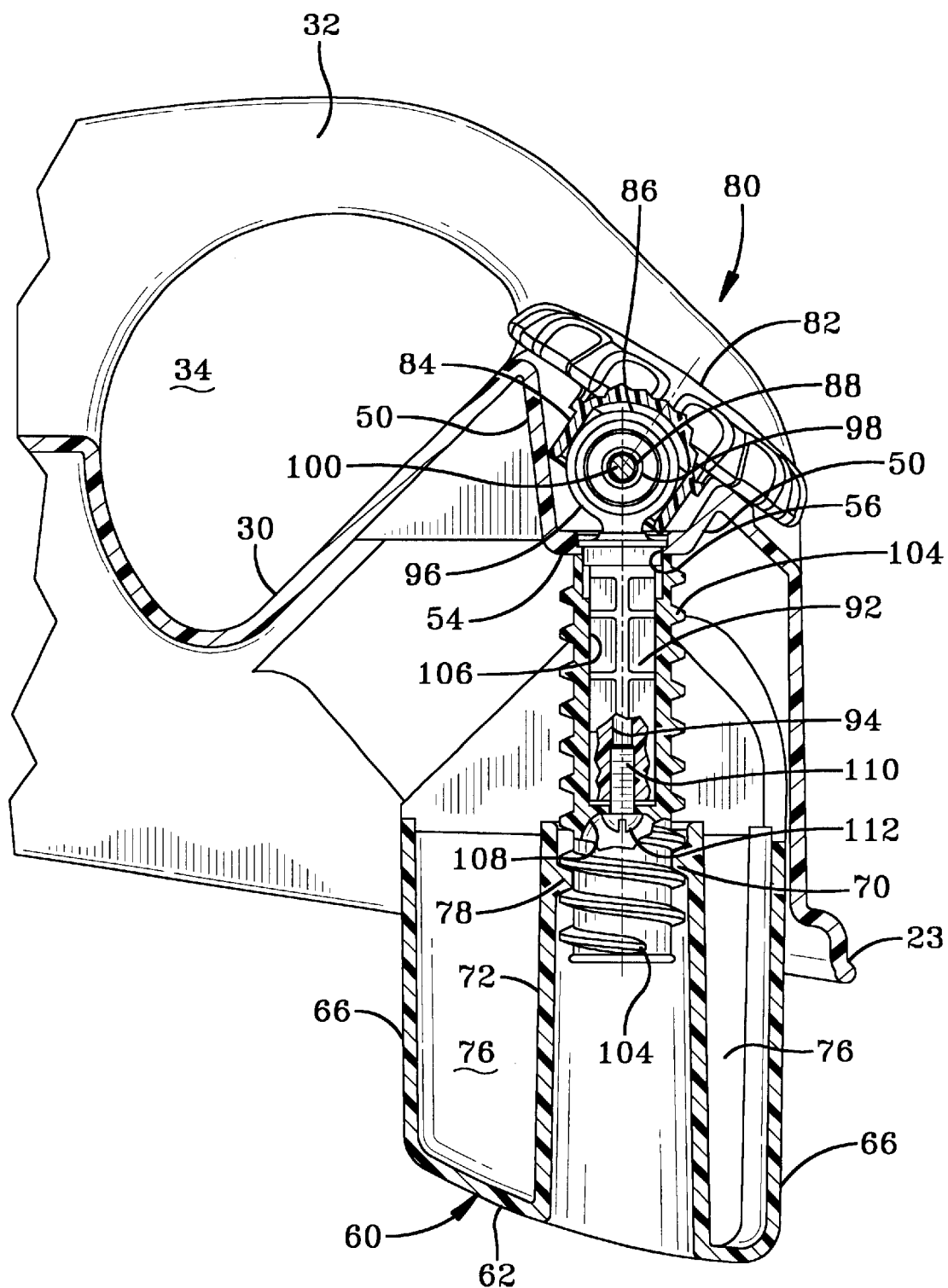
FIG. 5 is a partial cross-sectional view of an adjustment mechanism which controls the raising and lowering of a foot with respect to the car seat base, wherein the foot is shown in a raised position.

As best seen in FIGS. 3–5, a knob cup 50 extends below knob surface 38 at about a mid-point between sidewalls 24. A boss 52 surrounds knob cup 50. A lip 54 is provided at a bottom of knob cup 50 and has a shaft hole 56 therethrough.

Adjustable foot 18 includes an elongate body 60 which is received in inverted foot trough 44. Body 60 includes a bottom 62 with a pair of endwalls 64 and connecting front and back walls 66. Walls 64 and 66 form an open top 68. A pair of guide channels 70 are provided between front and back walls 66 and are aligned with and slidably receive towers 48 when foot 18 is received in foot trough 44.

A hollow support core 72 extends upwardly from bottom 62 and includes a bore 74 extending therethrough. A plurality of support flanges 76 extend between an outer surface of support core 72 and front and back walls 66. An inward thread 78, about one or two turns, is provided at or near top of bore 74.

An adjustment assembly, generally indicated by the numeral 80, includes a rotatable knob 82 which has a downwardly extending collar 84. Collar 84 forms a socket surface 86. Collar 84 also is provided with a transverse hole 88 extending therethrough. Adjustment assembly 80 also includes a universal joint 90 which is received in collar 84. In particular, universal joint 90 includes a shaft 92 which is cored to receive a self-tapping screw and has a ball 96 extending from an opposite end. Ball 96 includes a transverse hole 98 therethrough which is aligned with the hole 88 extending through the collar 84. A rivet or similar device 100 is inserted through the holes 88 and 98 to secure the universal joint 90 to the knob 82.

The sub-assembly of knob 82 and universal joint 90 is inserted into knob cup 50. Lip 54 functions to support an upper rim of shaft 92 and allows rotatable movement of shaft 52 within shaft hole 56. Once the sub-assembly is inserted into knob cup 50, an externally threaded sleeve 104 is secured to shaft 92. In particular, sleeve 104 is provided with a keyed pocket 106 with an inwardly extending annular ring 108. The annular ring 108 abuts a bottom surface of shaft 92. A screw or fastener 110, which has a head 112, is inserted into the underside of sleeve 104 for attachment to shaft 92. Foot 18 is inserted into inverted foot trough 44 such that the external threads provided by sleeve 104 mesh with and engage inward thread 78.

Knob surface 38 is provided with an angular orientation to allow for access to knob 82 even when the infant carrier is installed. This angular orientation of knob surface 38 facilitates the need for universal joint 90 which allows rotation of the external threads even though they are not collinear with knob 82.

In operation, the user installs car seat base 10 by securing seat belt 16 within vehicle belt path 22. The user then rotates knob 82 which in turn causes rotation of universal joint 90 and externally threaded sleeve 104. This engages inward thread 78 to push foot 18 downwardly which in turn raises frame 20 with respect to the surface of vehicle seat 12. This type of adjustment also causes tightening of the seat belt so that any slack is absorbed and the base is more tightly secured to the vehicle seat. It will also be appreciated that as the foot 18 is raised and lowered, channels 70 are guided by towers 48 so as to preclude undesired rotational motion of foot 18.

Other equivalent constructions may be employed to raise and lower a car seat base with respect to a vehicle car seat. For example, the shaft may be provide with internal threads that engage an external thread provided by the foot upon rotation of the knob. Alternatively, the shaft may be provided with a telescoping element, wherein rotation of the knob causes the raising or lowering of the element and in turn the car seat base. Yet another alternative would be to provide a threaded shaft, rotatable by a knob, that engages a slidable plate that raises and lowers the car seat base.

In view of the foregoing, it should thus be evident that a car seat base with adjustment described herein accomplishes the objects of the present invention and otherwise, substantially improves the art.

What is claimed is:

1. An adjustable base for carrying a car seat and adapted to rest on an automobile seat having an automobile seat back, comprising:

a frame having an adjustment end adapted to be positioned adjacent to the automobile seat back;

a foot coupled to said adjustment end, said foot having a thread; and an adjuster having a knob disposed proximal to said adjustment end and a threaded sleeve connected to the knob, said threaded sleeve engaging said thread, said knob being angled relative to the threaded sleeve to allow access thereto, rotating said knob moving said foot relative to the frame.

2. An adjustable base for carrying a car seat and adapted to rest on an automobile seat having an automobile seat back, comprising:

a frame having an adjustment end adapted to be positioned adjacent to the automobile seat back;

a foot coupled to said adjustment end; and an adjuster that adjusts said foot with respect to said adjustment end to change an angle of said frame with respect to the automobile seat, said adjuster being disposed proximal to said adjustment end and having a manual actuator that is angularly oriented with respect to said adjustment end to allow unobstructed access thereto, wherein said frame further includes a vehicle belt path proximal said adjustment end, a knob surface proximal said vehicle belt path, and an inverted foot trough disposed proximally underneath said knob surface for receiving said foot.

3. An adjustable base for carrying a car seat and adapted to rest on an automobile seat having an automobile seat back, comprising:

a frame having an adjustment end adapted to be positioned adjacent to the automobile seat back;

a foot coupled to said adjustment end; and an adjuster that adjusts said foot with respect to said adjustment end to change an angle of said frame with respect to the automobile seat, said adjuster being disposed proximal to said adjustment end and having a manual actuator that is angularly oriented with respect to said adjustment end to allow unobstructed access thereto, wherein said foot includes a threading and the adjuster has an elongated member with a complementary threading.

4. An adjustable base according to claim 3, wherein said manual actuator is a knob disposed proximal to said adjustment end, wherein rotating said adjustment knob raises or lowers said foot with respect to said adjustment end.

5. An adjustable base for carrying a car seat and adapted to rest on an automobile seat, comprising a frame having an adjustment end; a foot coupled to said adjustment end; and means for adjusting said foot with respect to said adjustment end to change the level of said frame with respect to the automobile seat, wherein said adjusting means includes an adjustment knob disposed proximal to said adjustment end, said foot coupled to said adjustment knob, wherein rotation of said adjustment knob raises or lowers said foot with respect to said adjustment end, and wherein said adjustment means further includes a universal joint connected to said adjustment knob, said universal joint having a plurality of external threads; said foot having a support core with a bore therethrough, said bore having an internal thread that meshes with said plurality of external threads, wherein rotation of said adjustment knob causes like rotation of said external threads to force said foot in an up or down direction.

6. An adjustable base according to claim 5, wherein said universal joint includes a shaft at one end and a ball with a hole therethrough at an opposite end, a sleeve secured to said shaft, said sleeve having said plurality of external threads that engage said bore internal threads, and said adjustment knob having a collar with a hole therethrough alignable with said ball hole for receiving a connecting pin to transfer rotation of said knob to said shaft.

7. An adjustable base according to claim 5, wherein said frame further includes a vehicle belt path proximal to said adjustment end; a knob surface proximal said vehicle belt path; and an inverted foot trough disposed proximally underneath said knob surface for slidably receiving said foot.

8. A car seat base which is secured to an automobile seat and which detachably receives an infant carrier, comprising a frame having a rim surface that rests upon the automobile seat, said frame having an adjustment end that extends above said rim, said adjustment end having a knob surface and forming an inverted trough on an underside of said frame; a foot slidably received in said inverted trough, said foot having a threaded area; an adjustment assembly carried by said knob surface and having threads that mesh with said threaded area, wherein actuation of said adjustment assembly engages said threads with said threaded area and causes slidable movement of said foot in said inverted trough which in turn changes the position of said frame with respect to the automobile seat.

9. A car seat base according to claim 8, wherein said adjustment end includes a back surface which is placed adjacent the automobile seat, said knob surface angularly extending therefrom to allow access to said adjustment assembly.

10. A car seat base according to claim 9, wherein said knob surface extends from said back surface at an angle other than a right angle.

11. A car seat base according to claim 8, wherein said adjustment assembly includes a rotatable knob having a downwardly extending collar; a universal joint having a ball at one end that is received and secured in said collar and a shaft at an opposite end; and an externally threaded sleeve secured to said shaft, wherein rotation of said knob forces rotation of said externally threaded sleeve.

12. A car seat base according to claim 11, wherein said foot includes a support core with an internal thread that meshes with said externally threaded sleeve, wherein rotation of said knob in one direction raises said frame and rotation of said knob in an opposite direction lowers said frame.

13. A car seat base according to claim 12, wherein said frame includes an underside having at least one downwardly extending tower, said foot having a guide channel for slidably receiving said tower.

14. An adjustable base for carrying a car seat and adapted to rest on an automobile seat, comprising a frame having an adjustment end; a foot coupled to said adjustment end; and means for adjusting said foot with respect to said adjustment end to change the level of said frame with respect to the automobile seat, wherein said frame has an underside with downwardly extending towers at said adjustment end; and said foot has guide channels for slidably receiving said towers.

15. An adjustable base for carrying a car seat and adapted to rest on an automobile seat having an automobile seat back, comprising:
- a frame having an adjustment end adapted to be positioned adjacent to the automobile seat back;
- a foot coupled to the adjustment end, the foot having a thread; and
- an adjuster having a knob disposed proximal to the adjustment end and a threaded sleeve connected to the knob, the threaded sleeve engaging the thread, the knob being positioned to allow unobstructed access thereto, rotating the knob moving the foot relative to the frame.

16. An adjustable base according to claim 15, wherein the adjuster includes a universal joint at an upper end of the threaded sleeve, the knob being connected to the universal joint to allow the knob to be angled relative to the threaded sleeve.

17. An adjustable base according to claim 16, wherein the universal joint comprises a ball with a through hole, a collar with a through hole alignable with the ball through hole, the collar being formed on the knob, and a connecting pin inserted into the ball and collar through holes to permit rotation transfer from the angled knob to the threaded sleeve.

18. An adjustable base according to claim 17, wherein the threaded sleeve is hollow and the universal joint includes a shaft inserted into the sleeve and secured thereto.

* * * * *